(12) United States Patent
Shirai et al.

(10) Patent No.: US 7,845,854 B2
(45) Date of Patent: Dec. 7, 2010

(54) MOTION GUIDE DEVICE

(75) Inventors: Takeki Shirai, Tokyo (JP); Toshikazu Yoshii, Tokyo (JP)

(73) Assignee: THK Co., Ltd., Tokyo (JP)

( * ) Notice: Subject to any disclaimer, the term of this patent is extended or adjusted under 35 U.S.C. 154(b) by 638 days.

(21) Appl. No.: 11/793,414

(22) PCT Filed: Dec. 19, 2005

(86) PCT No.: PCT/JP2005/023264

§ 371 (c)(1),
(2), (4) Date: Jun. 20, 2007

(87) PCT Pub. No.: WO2006/068089

PCT Pub. Date: Jun. 29, 2006

(65) Prior Publication Data

US 2008/0144981 A1      Jun. 19, 2008

(30) Foreign Application Priority Data

Dec. 21, 2004  (JP) .............................. 2004-370149
Nov. 30, 2005  (JP) .............................. 2005-347067

(51) Int. Cl.
*F16C 29/06*     (2006.01)
(52) U.S. Cl. ......................................... 384/43; 384/45
(58) Field of Classification Search .............. 384/43–45, 384/51, 625; 29/898.03, 898.12
See application file for complete search history.

(56) References Cited

U.S. PATENT DOCUMENTS 4,806,022 A * 2/1989 Takahiro ...................... 384/45
4,892,415 A * 1/1990 Katahira ...................... 384/45
5,161,896 A * 11/1992 Hofling et al. ................ 384/44

(Continued)

FOREIGN PATENT DOCUMENTS

DE          3520815 A1 * 12/1986

(Continued)

OTHER PUBLICATIONS

International Search Report of PCT/JP2005/023264, date of mailing Mar. 14, 2006.

(Continued)

*Primary Examiner*—Marcus Charles
(74) *Attorney, Agent, or Firm*—Westerman, Hattori, Daniels & Adrian, LLP

(57)    ABSTRACT

A motion guide device 10 includes a track rail 11 as a track member and a movable member 13 mounted to the track rail 11 via a plurality of balls 12. The plural balls 12 of the motion guide device 10 are disposed in an endless circulation passage 20 composed of a loaded rolling passage 15 formed between the track rail 11 and the movable member 13, and a non-loaded rolling passage formed to the movable member 13 so as to connect one and another ends of the loaded rolling passage 15. A portion of the track rail 11 or movable member 13 in the vicinity of the rolling member rolling surface thereof contacting to the plural balls 12 is formed of a metal material, and the other portion thereof is formed of an FRP. According to such structure, there can be provided a motion guide device 10 having a high strength and a high rigidity as well as a reduced weight.

7 Claims, 13 Drawing Sheets

U.S. PATENT DOCUMENTS

| | | | | |
|---|---|---|---|---|
| 5,295,748 A | * | 3/1994 | Yamazaki | 384/45 |
| 5,431,498 A | * | 7/1995 | Lyon | 384/45 |
| 5,640,768 A | * | 6/1997 | Teramachi | 29/898.03 |
| 5,800,065 A | * | 9/1998 | Lyon | 384/45 |
| 5,993,064 A | * | 11/1999 | Teramachi et al. | 384/43 |
| 6,080,351 A | * | 6/2000 | Shirai | 29/898.12 |
| 2003/0128901 A1 | * | 7/2003 | Yabe et al. | 384/45 |
| 2005/0054468 A1 | | 3/2005 | Nagai et al. | |

FOREIGN PATENT DOCUMENTS

| | | |
|---|---|---|
| JP | 59-133813 A | 8/1984 |
| JP | 60-78108 A | 5/1985 |
| JP | 2-309011 A | 12/1990 |
| JP | 5-459 A | 1/1993 |
| JP | 6-203697 A | 7/1994 |
| JP | 7-188883 A | 7/1995 |
| JP | 9-250541 A | 9/1997 |
| JP | 9-303389 A | 11/1997 |
| JP | 2002-130274 A | 5/2002 |
| JP | 2003-35314 A | 2/2003 |
| JP | 2003-113836 A | 4/2003 |
| JP | 2003-343551 A | 12/2003 |
| JP | 2004-52966 A | 2/2004 |

OTHER PUBLICATIONS

Supplementary European Search Report dated Jun. 17, 2010, issued in corresponding European Patent Application No. 05816712.3.

* cited by examiner

The main curvature surface 1

The main curvature surface 2 a case of convex curvature
(rolling member)

a case of concave curvature
(rolling surface)

The main curvature surface 1

The main curvature surface 2

FRP : $E_1$, $h_1$ metal material : $E_2$, $h_2$

FRP : $E_1$ metal material : $E_2$, $h_2$

MOTION GUIDE DEVICE

FIELD OF THE INVENTION

The present invention relates to a motion guide device, and more particularly, to a motion guide device in which a portion near a rolling member rolling surface is formed of a metal material and remaining portion is formed of FRP (Fiber Reinforced Plastic).

BACKGROUND ART

In a conventional technology, in a motion guide device such as linear guide, linear guide device, ball spline device, ball screw device or the like, members or parts constituting such devices are subjected to repeated rolling motion, sliding motion or the like motion, and accordingly, such constituting members or parts are formed generally of a metal material having high hardness such as high carbon chromium bearing steel, stainless steel, case hardening steel or like.

However, in recent years, it has been required to realize a device having light weight in requirement of widening applicable range of the motion guide devices, and in order to satisfy such requirement, some ideas for the light weighting have been proposed. For example, the following Patent Publication 1 discloses an invention in which an aluminium alloy is used for a member constituting a guide rail as a track member for the purpose of lightening the linear guide device.

Patent Publication 1: Japanese Unexamined Patent Application Publication No. H02-309011

DISCLOSURE OF THE INVENTION

Problems to be Solved by the Invention

However, in the invention disclosed in the Patent Publication 1, as like as in the conventional technology, main members or parts of the motion guide device are formed of a metal material, so that the lightweight requirement can be achieved to some extent, but it is difficult to fully satisfy the recent requirement of the lightweight. In addition, since an applicable range of the lightweight material is not disclosed, it is difficult to apply the invention of the Patent Publication 1 to a guide rail having a shape other than the disclosed guide rail or a motion guide device (such as linear guide device, ball spline device, ball screw device or like) other than the linear guide device.

Further, there is also known an FRP (Fiber Reinforced Plastic) as a material for having strength and rigidity like a metal material such as steel and realizing lightweight requirement. This FRP can reinforce the plastic by using fiber and resin and extremely improve strength, so that the FRP is utilized in various fields such as space-air industry, motorcycle, automobile, railway, and construction industries.

However, since the FRP is inferior in abrasion resistance in comparison with a metal material, it has been difficult to apply the FRP to a motion guide device.

Then, the present invention was conceived in consideration of the circumstances mentioned above and an object thereof is to provide a motion guide device capable of realizing reduced weight requirement by applying the FRP to the motion guide device.

Means for Solving the Problem

One embodiment of the motion guide device according to the present invention is a motion guide device comprising: a track member; and a movable member mounted to the track member to be movable through a plurality of rolling members, wherein a portion in a vicinity of a rolling surface of the rolling member of the track member or movable member contacting to the plural rolling members is formed of a metal material and another portion thereof is formed of a fiber reinforced plastics (FRP).

Another embodiment of the motion guide device according to the present invention is a motion guide device comprising: a track member; and a movable member mounted to the track member to be movable through a plurality of rolling members, wherein the track member or movable member includes a rolling portion formed of a metal material constituting a rolling surface of the rolling member in contact to the plural rolling members, and a track member body or movable member body formed of a fiber reinforced plastics (FRP) forming the track member or movable member by being joined with the rolling portion.

In the motion guide device according to the present invention, the rolling portion has a minimum thickness more than a maximum shearing stress depth obtained by a Hertz theory, and has a maximum thickness satisfying an equation of $E_1 I_1 / E_2 I_2 \geq 5$, wherein: $E_1$: vertical elasticity coefficient of FRP, $I_1$: second moment of area, $E_2$: vertical elasticity coefficient of metal material, and $I_2$: second moment of area of metal material.

Furthermore, in the motion guide device according to the present invention, the maximum thickness of the rolling portion is less than a thickness h2 obtained by the following equation of:

$$\frac{E_1 I_1}{E_2 I_2} = \frac{E_1 h_1^3}{E_2 h_2^3} \geq 5 \qquad \text{[Equation 1]}$$

wherein: $E_1$: vertical elasticity coefficient of FRP, $I_1$: second moment of area, $h_1$: thickness of FRP, $E_2$: vertical elasticity coefficient of metal material, $I_2$: second moment of area of metal material, and $h_2$: thickness of metal material.

Still furthermore, in the motion guide device according to the present invention, the FRP is comprised at least one of CFRP, GFRP, or KFRP.

Still furthermore, in the motion guide device according to the present invention, the joining of the metal material and the FRP is performed by a joining method including at least one, a bond joining, pressure joining, or bolt joining.

Still furthermore, in the motion guide device according to the present invention, the reinforced fiber in the FRP is comprised without being cut off after a molding process.

Still furthermore, in the motion guide device according to the present invention, an outer configuration of the portion formed of the FRP is molded by a reinforced fiber laminated without being cut off and a nest provided with a gap between the reinforced fiber.

Still furthermore, the motion guide device according to the present invention is formed as a ball screw device provided with a screw shaft as the track member and a nut mounted on the screw shaft through a plurality of rolling members to be relatively rotatable.

Further, it is to be noted that the above embodiments of the present invention do not provide all the characteristic features necessary for the present invention, and sub-combination of these characteristics may constitute the present invention.

Effects of the Invention

According to the motion guide device of the present invention, the rolling member rolling surface contacting to a plurality of the rolling members is formed of a metal material and the other portions is formed of an FRP, so that it is possible to provide a motion guide device maintaining the strength and rigidity more than those of a conventional one with a reduced weight thereof.

REFERENCE NUMERALS

10 - - - motion guide device, 11 - - - track rail, 11a, 13a - - - loaded rolling groove, 11b - - - bolt mounting hole, 12 - - - ball, 13 - - - movable member, 13b - - - opening, 13c - - - upper surface, 13d - - - female screw, 14 - - - screw shaft, 15 - - - loaded rolling passage, 16 - - - return passage, 17 - - - ball guide passage, 18 - - - end lid, 19 - - - non-loaded rolling passage, 20 - - - endless circulation passage, 21 - - - spacer member, 30, 40, 41, 42, 44 - - - rolling portion, 31 - - - track body, 31a - - - joining surface, 31b - - - nest, 43 - - - movable member body, 50 - - - ball screw device, 51 - - - screw shaft, 52 - - - ball, 53 - - - nut, f - - - reinforced fiber, t - - - tapered shape

BEST MODE FOR CARRYING OUT THE INVENTION

Hereunder, an embodiment for carrying out the present invention will be explained with reference to the accompanying drawings. Further, the following embodiment does not limit the invention in each patent claim, and it is not always limited that all the combination of characteristic features explained in the embodiment is essential for the solution of the invention.

Further, a "motion guide device" in the present specification includes devices performing every rolling/sliding motion such as general rolling bearing utilized for a machine tool, non-lubricant bearing used in vacuum condition, linear guide, linear guide device, ball spline device, ball screw device and so on.

Application to Linear-Type Motion Guide Device

Figure 1:
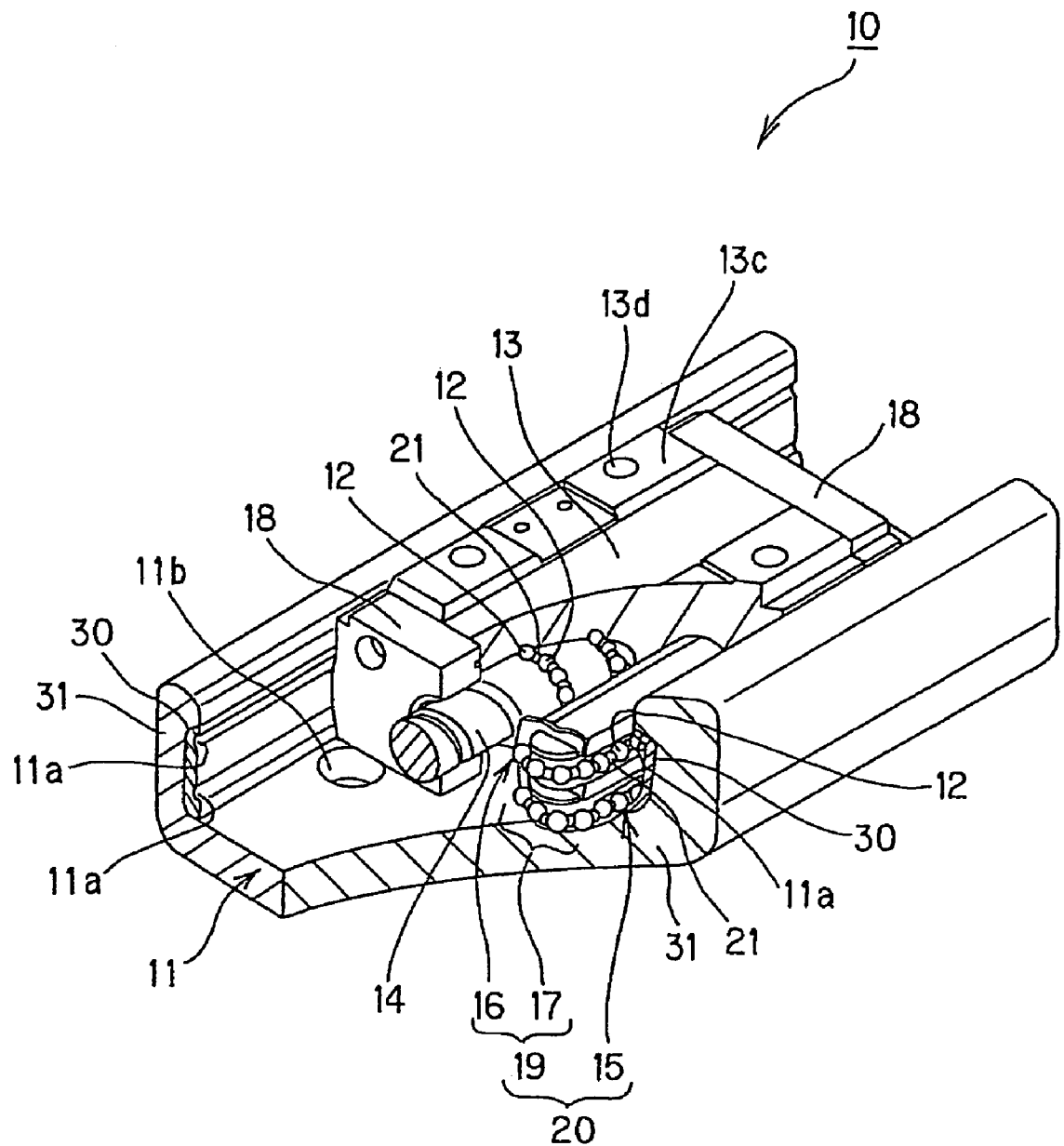
[FIG. 1] is a perspective view, partially cutaway, of a motion guide device according to a present embodiment.
Figure 2:
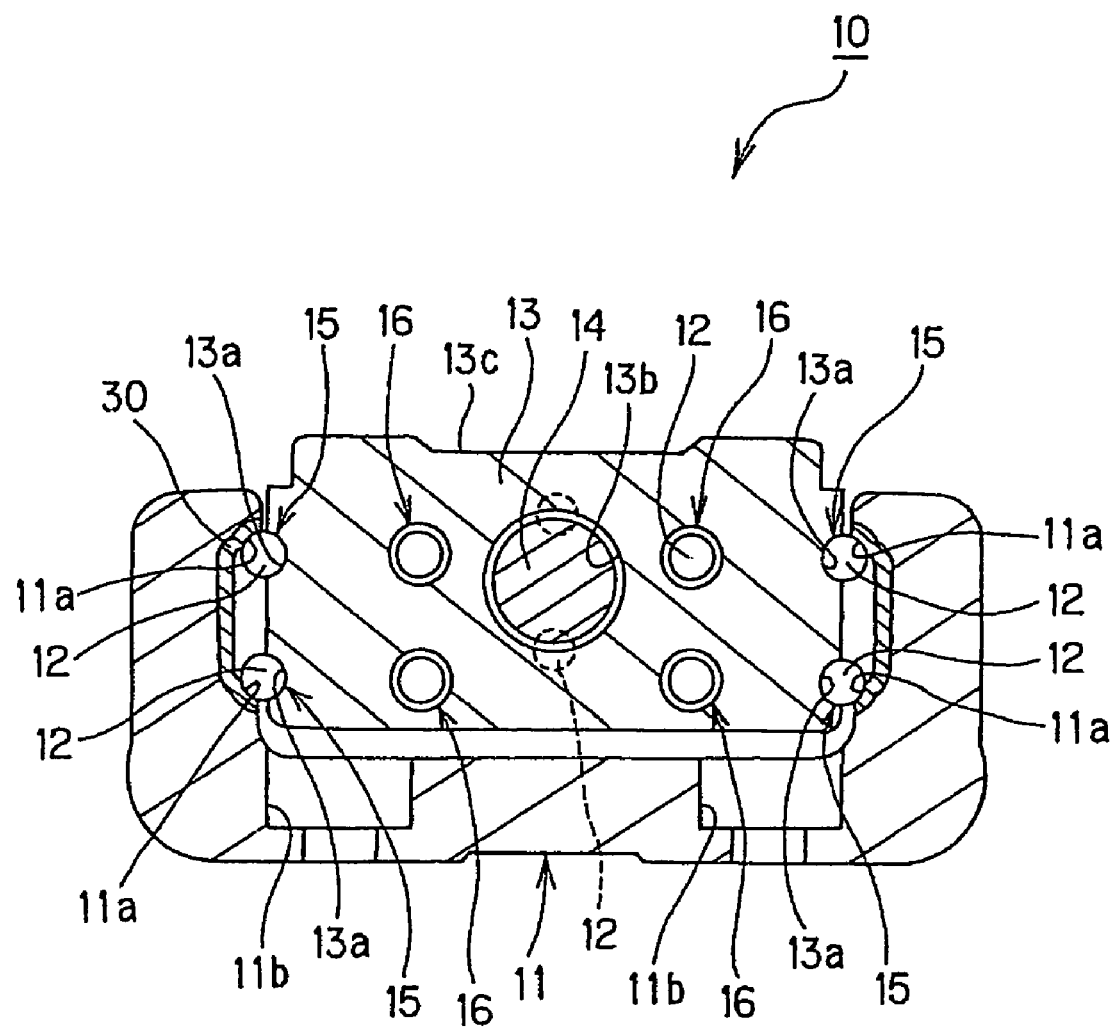
[FIG. 2] is a cross sectional view of the motion guide device according to the present embodiment.

FIGS. 1 and 2 are views showing one example of a motion guide device according to one embodiment of the present invention. Specifically, FIG. 1 is a perspective view, partially cut away, for explaining schematic structure of the motion guide device according to the present embodiment, and FIG. 2 is an elevational section of the motion guide device.

A motion guide device 10 shown in FIGS. 1 and 2 is composed of combination of a liner motion guide and a ball screw. The motion guide device 10 mainly includes a track rail 11 as track member and a movable member 13 mounted to the track rail 11 through balls 12 as rolling members to be movable. The movable member 13 has an opening 13b at its centre, and the opening 13b is formed with a spiral screw thread. A screw shaft 14 is inserted into this opening 13b to be rotatable through the balls 12, 12, - - - .

The track rail 11 is a long scale member having a substantially U-shaped section, and two rows of loaded rolling grooves 11a, 11a capable of being received with the balls 12, - - - are provided to each side surface along the entire longitudinal direction of the track rail 11. The track rail 11 is provided with a plurality of bolt mounting holes 11b at an optional interval along the longitudinal direction thereof, and the track rail 11 is fixed to a predetermined mounting surface, for example, an upper surface of a bed of a machine tool, by means of bolts, not shown, screwed to the bolt mounting holes 11b. Further, although in the illustration, the track rail 11 has a linear shape, a curved one may be used.

The movable member 13 is composed of a block formed a hole to a metal material having a high strength such as steel and so on. The movable member 13 is provided with four rows of loaded rolling grooves 3a, 13a, - - - corresponding to four loaded rolling grooves 11a, 11a, - - - of the track rail 11. Combination of corresponding loaded rolling grooves 11a and 13a constitutes four loaded rolling passage 15, 15, - - - between the track rail 11 and the movable member 13. Furthermore, a plurality of female screws 13d (actually, four, but only three is shown In FIG. 1) are provided in the upper surface of the movable member 13, and by utilizing these female screws 13d, 13d, - - - , the movable member 13 is fixed to a predetermined mounting surface, for example, a lower surface of a saddle or table of a machine tool. It is further to be noted that the movable member 13 is not formed only from the metal member, and it may be formed of a plastic which is integrally injected together with a metal material having high strength such as steel.

The movable member 13 is also provided with four rows of return passages 16, 16, - - - extending in parallel with the four rows of loaded rolling passages 15, 15, - - - . The movable member 13 also has end lids 18 at its both end surfaces, and each of the end lids 18 is provided with an arch-recessed ball guide groove, not shown, so as to form a ball guide groove 17 protruding in form of arch between the loaded rolling passage 15 and the return passage 16 (in FIG. 1, two rows of ball guide passages 17, 17 on one corner are shown with the end lid 18 being removed).

When the end lids 18 are surely fixed as the movable member 13, the ball guide passages 17, 17 are formed between the end lids 18 and the movable member 13 so as to connect the loaded rolling passages 15, 15 and the return passages 16, 16, respectively. The return passages 16 and the ball guide passages 17, 17 constitute non-loaded rolling passages 19, and in combination of the non-loaded rolling passages 19 and the loaded rolling passages 15, 15, an endless circulation passage 20 is formed.

A spacer member 21 soften than balls 12 is disposed between balls 12, 12 of the motion guide device 10 of the present embodiment. Further, as shown in FIG. 1, the spacer member 21 disposed between the track rail 11 and the movable member 13 has a belt-shape and a spacer member 21 is adapted as a retainer which is inserted between the balls 12. However, the kinds or combinations of the spacer members 21 are not limited to those shown in FIG. 1, and for example, a spacer ball having a diameter smaller than that of the ball 12 as rolling member may be adopted. The spacer members 21 disposed in such manner acts to prevent interference or colliding between the adjacent balls 12, 12 or prevent the balls from coming off. In addition, the location of the spacer members 21 realizes the alignment of the balls 12, 12, - - - and attains improved abrasion-proof performance of the motion guide device 10 together with self-lubricating effect.

As a material of the spacer member 21 mentioned above, there is provided a resin including at least one of polytetrafluoride ethylene (PTFE) resin, polyimide (PI), polyamide (PA), polyoxymethylene (POM), polyester, phenol resin, epoxy resin, polyetheretherketone (PEEK, registered trademark), or polyethersulfone (PES). The spacer member 21 is formed of these resins as simple substance or compound substance of resin integrally by the injection molding method.

Herein, as characteristic feature of the motion guide device 10 of the present embodiment, it is pointed out that the track rail 11 as track member has a portion near the rolling member rolling surface (loaded rolling groove 11*a*) contacting to the balls 12, which is formed of a metal material and other portions which are formed of an FRP (fiber reinforced plastic). According to such characteristic feature, the motion guide device 10 of the present embodiment 10 maintains strength and rigidity equal to or more than those of a conventional motion guide device as well as realizes lightweight requirement.

The structure of the track rail 11 of the present embodiment will be explained more in detail with reference to FIG. 3, which is a cross sectional view of the track rail 11.

The track rail 11 of the present embodiment is composed of a rolling portion 30 formed of a metal material and a track member body 31 formed of the FRP, which are joined together. The rolling portion 30 formed of the metal material is a portion occupying a portion near the loaded rolling groove 1 1*a* forming the rolling member rolling surface contacting to the ball 12, and this portion requires high strength, high rigidity and high abrasion-proof performance. As a material forming such rolling portion 30, there may be provided high hardness material such as high carbon chromium bearing steel, stainless steel, or case hardening steel, or aluminium alloy, beryllium copper, titanium alloy or like.

On the other hand, the track member body 31 is formed of the FRP so as to realize the reduced weight requirement of the motion guide device 10 of the present embodiment. As the FRP to be utilized, there may be provided at least one of CFRP (Carbon Fiber Reinforced Plastics), GFRP (Glass Fiber Reinforced Plastics), and KFRP (Kevlar Fiber Reinforced Plastics). Specifically, the CFRP has a excellent strength and capable of providing strength with respect to desirable shape and realizing reduced weight requirement by changing a lamination direction or a lamination number of the carbon fibers, thus being a desirable material.

Figure 3:
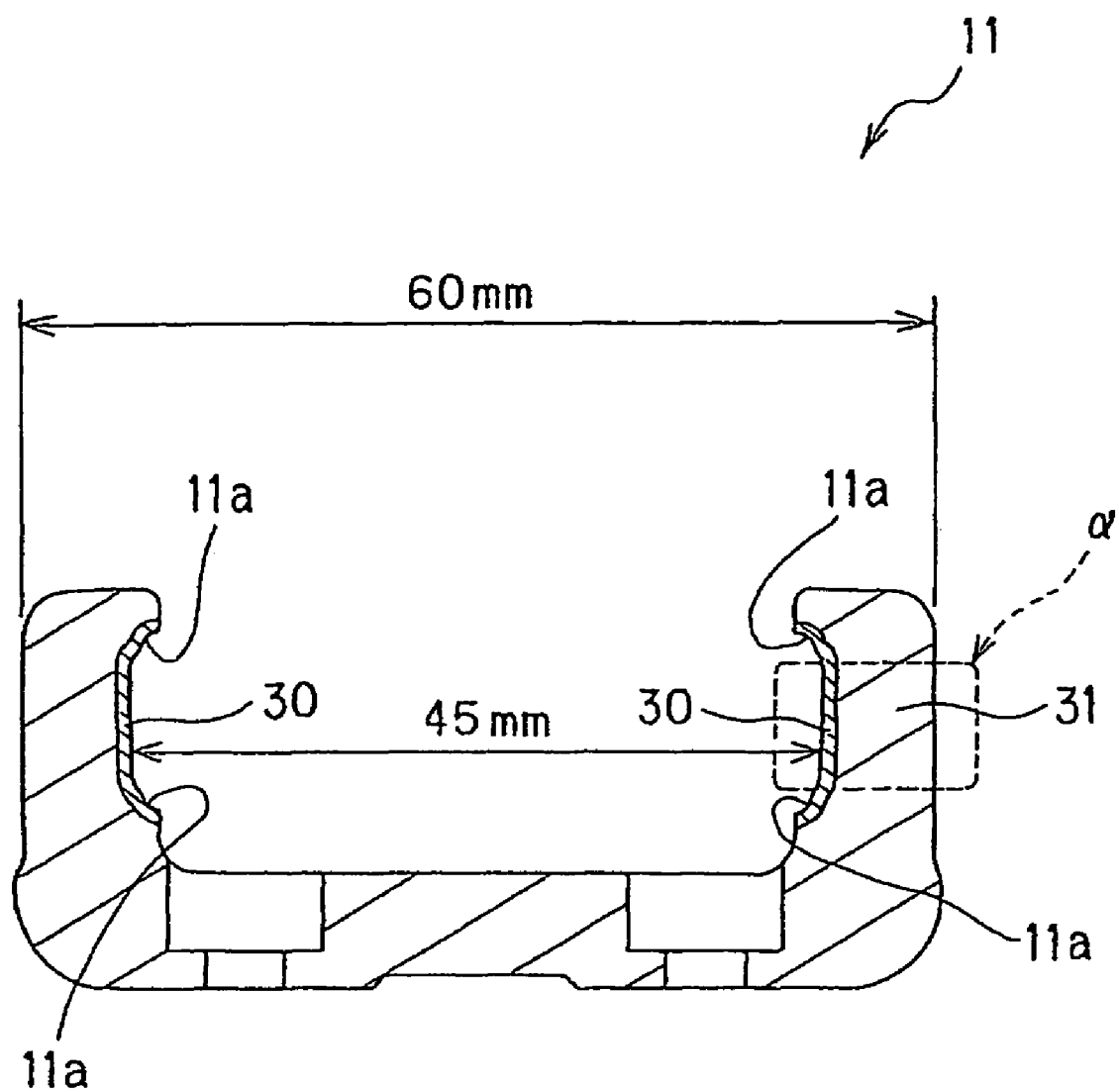
[FIG. 3] is a cross sectional view for explaining a structure of a track rail according to the present embodiment.
Figure 4:
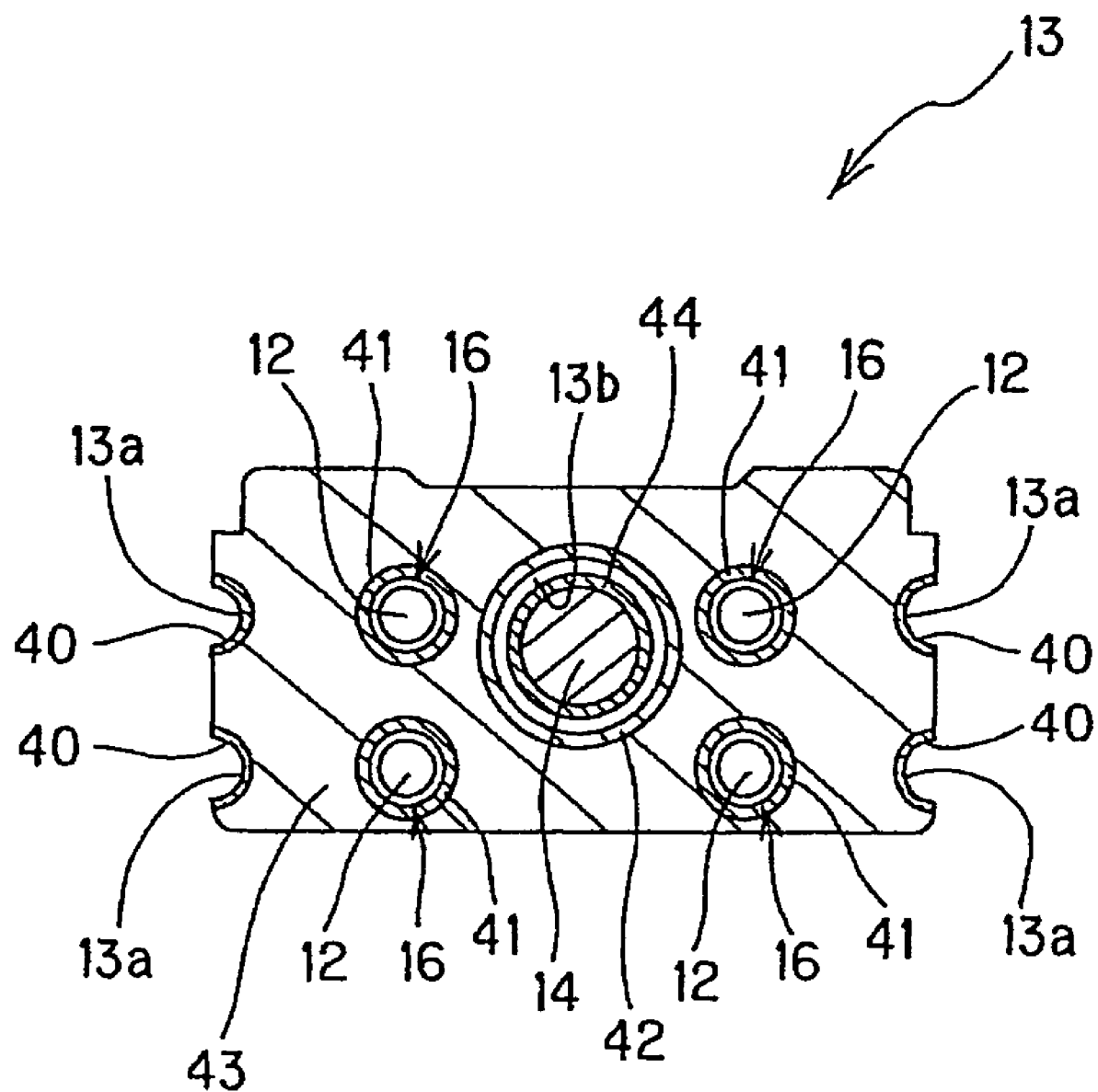
[FIG. 4] is a cross sectional view for explaining a movable member to which the present embodiment is applied.

Further, in the motion guide device 10 of the present embodiment shown in FIGS. 1 to 3, although only the track rail 11 is formed from the metal material and the FRP, the present invention is not limited to such embodiment, and as shown in FIG. 4, these material and fiber may be used for forming the movable member 13 and the screw shaft 14. That is, portions near the four rows of loaded rolling grooves 13*a*, 13*a*, - - - forming the loaded rolling passages 15 in association with the four loaded rolling grooves 11*a*, 11*a*, - - - of the track rail 11 are formed as rolling portions 40 formed of the metal material, portions near the four rows of return passages 16, 16, - - - extending in parallel with the four loaded rolling passages 15, 15, - - - are formed as rolling portions 41 formed of the metal material, or a portion near the opening 13*b* into which the screw shaft 14 is inserted through the balls 12, 12, - - - is formed as a rolling portion 42 formed of the metal material. Furthermore, an outer peripheral portion of the screw shaft 14 contacting to the balls 12, 12, - - - is formed as a rolling portion 44 formed as the metal material, and other portion is formed as a movable member body 43 formed of the FRP. By forming the movable member 13 or the screw shaft 14, as well as the track rail 11, with the combination of the metal material and the FRP, the weight of the motion guide device 10 can be further realized.

Moreover, a method of joining the rolling portion 30 formed of the metal material and the track member body 31 formed of the FRP, joining the rolling portions 40, 41, 42 formed of the metal material and the movable member body 43 formed of the FRP, or joining the rolling portion 44 formed of the metal material and the other portion of the screw shaft 14 formed of the FRP may be performed by using bonding agent, by press-fitting or by using bolts, or by combination of these method.

For example, in the case of the track rail 11 shown in FIG. 3, it is preferable to perform the joining by a bonding agent. In the case of the movable member 13 shown in FIG. 4, it is preferable to perform the bond joining by the bonding agent the rolling member 40 near the loaded rolling grooves 13*a*, 13*a*, - - - , and it is also preferable to perform the pressing joining for forming the rolling portion 41, 42 of near the return passages 16, 16, - - - and the opening 13*b*. The press joining may be surely performed by a knurl working to the outer peripheral surface of the rolling portion 41, 42 or the inner peripheral surface of the return passages 16 and opening 13*b* and then performing the press-fitting working. In addition, it is possible to adapt bolt-joining for increasing joining strength, and as a more accurate joining method, it may be possible to adopt a joining method performed by combining the bonding joining and the bolt joining, and the press joining and the bolt joining. However, in the case of the bolt joining, it will be necessary to take care that the head portion of the bolt does not affect a bad influence to the operation of the motion guide device 10. Further, with respect to the member having a shape of such as screw shaft 14, a preferred joining method may be adopted in accordance with the appearance or substance.

Hereinabove, with reference to the drawings, the structural features of the motion guide device 10 of the present embodiment was described, and hereinafter, installation standard of the metal material and the FRP will be explained, and according to such explanation, the usable range of the FRP as the lightweight material will be made clearer.

Minimum Thickness

In the motion guide device, it is considered, based on life-time theory of a rolling bearing, that fatigue is caused at a portion of certain depth and a peeling is started from this portion. For this reason, in the case of only the metal material, it is required to have a quenching depth for covering its depth. Then, as to the metal material to be joined to the FRP, the depth for covering the maximum shearing stress depth is made to be the minimum thickness. More specifically, from the Hertz theory, a radius of a contacting ellipsoid (long axis and short axis) can be calculated from a radius of curvature, load, and material characteristics in a case where two materials contact each other, and the maximum shearing stress can be calculated from this radius. The details thereof will be explained hereunder.

Figure 5:
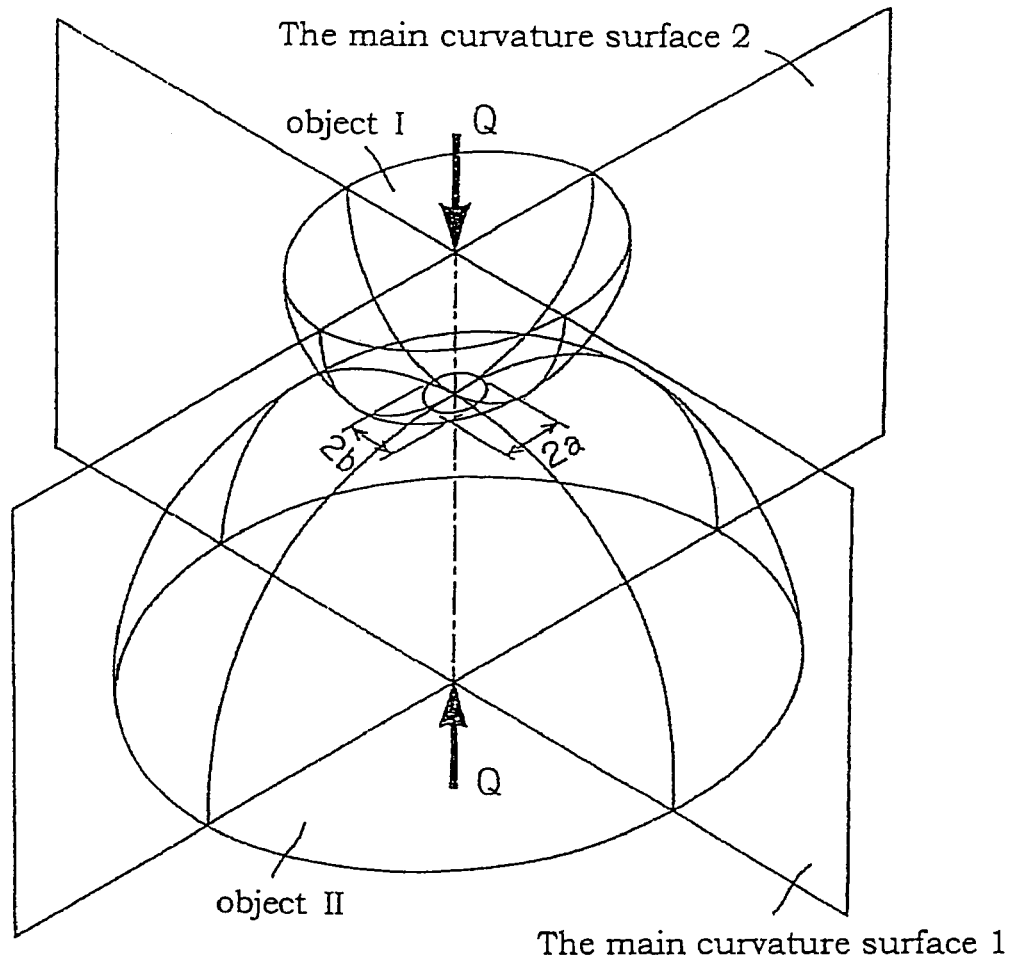
[FIG. 5] is a view for explaining the Hertz theory and showing a contacting state of two objects.

FIG. 5 is a view for explaining the Hertz theory, which represents the contacting condition of two materials. As shown in FIG. 5, when two spheroids contact each other under pressure at a load of "Q", curved surfaces of the object I and object II have two main curvature surfaces perpendicular to each other, and the maximum curvature and the minimum curvature of the respective objects are included within the surfaces. Here, the radius of curvature of a curved line (curve) may be expressed as "r", the curvature "ρ" may be shown with $\rho=1/r$. Hereinafter, the radius "r" and the curvature "ρ" will be shown as "$r_{II}$", and curvature "$\rho_{II}$" in the case of the main curvature surface I of the object I, for example. That is, the first suffix represents the object and the second suffix represents the main curvature surface.

Figure 6A:
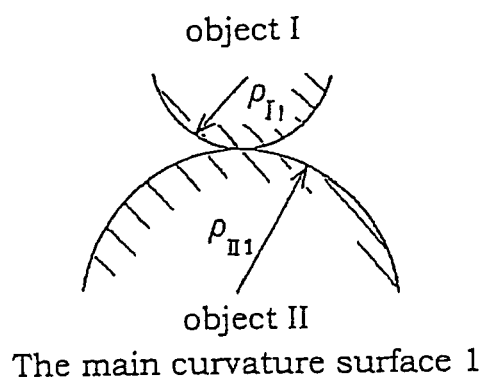
[FIG. 6A] is a view showing a section of a main curvature surface 1 of the objects I and II.
Figure 6B:
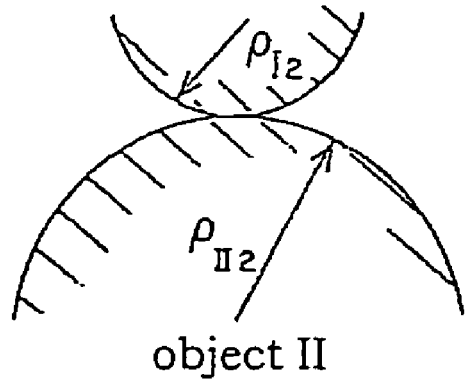
[FIG. 6B] is a view showing a section of a main curvature surface 2 of the objects I and II.

Further, FIG. 6A and FIG. 6B show the sections of the main curvature surface 1 and the main curvature surface 2. FIG. 6A is a view showing the section of the main curvature surface 1 of the objects I and II in FIG. 5, and FIG. 6B is a view showing the section of the main curvature surface 2 of the objects I and II in FIG. 5.

Figure 6C:
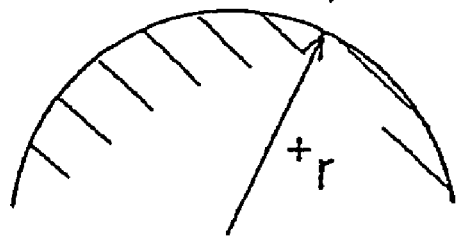
[FIG. 6C] is a view showing a setting manner of curvature radius in a case of convex curvature such as rolling member.
Figure 6D:
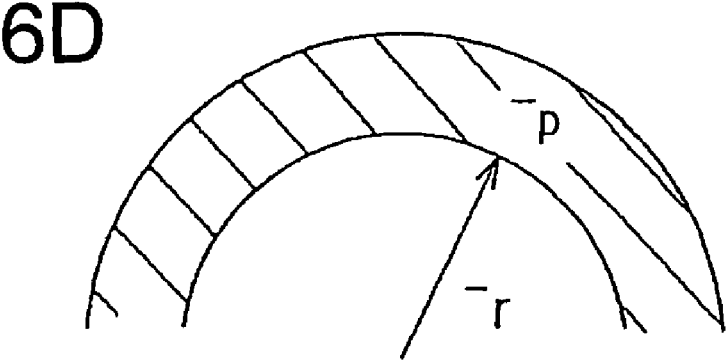
[FIG. 6D] is a view showing a setting manner of curvature radius in a case of concave curvature such as rolling surface.

In addition, a sign is added to the curvature "ρ", and as shown in FIG. 6C, a case, in which a material surface provides a protruded surface and a center of curvature is inside the material, is made to be "positive" and as shown in FIG. 6D, a case, in which a material surface provides a recessed surface and a center of curvature is in a space outside the material, is made to be "negative".

It is first necessary to obtain Hertz coefficient, i.e., coefficient values of "μ" and "ν" of the radii of long/short axes of the contacting ellipsoid from the obtained curvature $\rho_{I1}$, $\rho_{I2}$, $\rho_{II1}$, and $\rho_{II2}$. Then, in order to obtain the Hertz coefficient, concomitant variable of cos π is first calculated, which is expressed by the following equation (Equation 2)

$$\cos\tau = \frac{|(\rho_{I_1} - \rho_{I_2}) + (\rho_{II_1} - \rho_{II_2})|}{\Sigma \rho}$$  [Equation 2]

Herein, the numerator is called main curvature difference and the denominator is called main curvature sum, which are expressed by the following equation (Equation 3).

$$\Sigma\rho = (\rho_{I1}+\rho_{I2})+(\rho_{II1}+\rho_{II2})$$  [Equation 3]

Next, according to the Hertz's induction, the coefficient of "μ" and "ν" are obtained by the concomitant variable of cos π. The coefficient of "μ" and "ν" are usually shown on a list with respect to the concomitant variable of cos π, and the following table 1 shows typical ones of goodness of fit ($r/D_a$) of the rolling member and the rolling surfaces.

TABLE 1

| $r/D_a$ | cosτ | μ | ν |
|---|---|---|---|
| 0.51 | 0.9615 | 4.578 | 0.3750 |
| 0.52 | 0.9259 | 3.507 | 0.4308 |
| 0.53 | 0.8929 | 3.006 | 0.4679 |

Figure 7A:
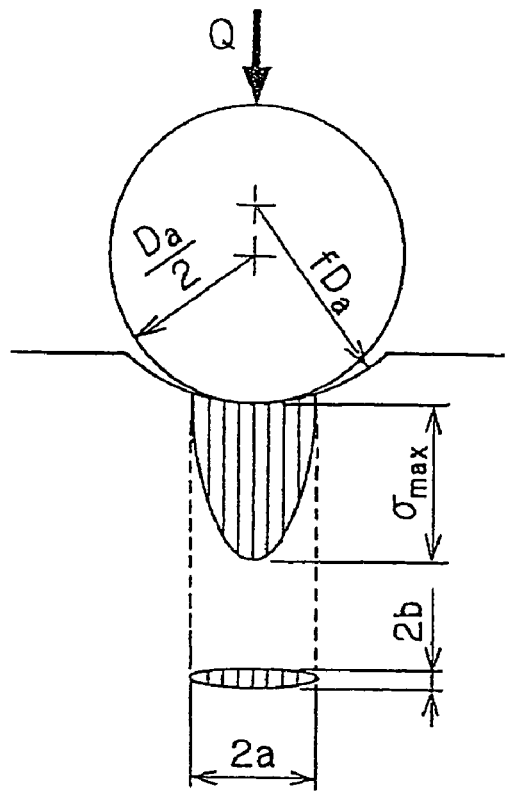
[FIG. 7A] is a view of the main curvature surface 1 as viewed from a moving direction of the movable member.
Figure 7B:
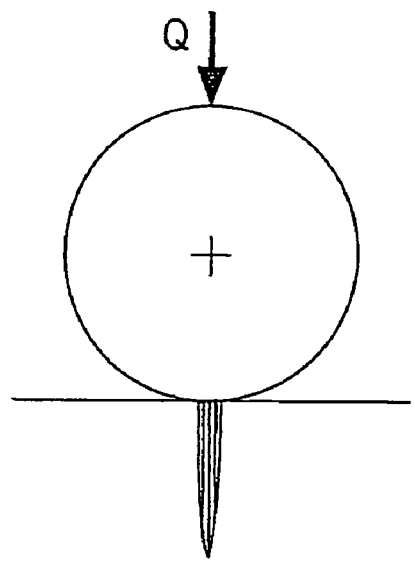
[FIG. 7B] is a view of the main curvature surface 2 as viewed from a side in a right-angled direction with respect to the case shown in FIG. 7A.

Herein, FIGS. 7A and 7B show, as schematic views, a condition in which a ball and a ball rolling surface contact each other. FIG. 7A is a view observing the main curvature surface 1 from a moving direction of a moving member, and FIG. 7B is a view observing the main curvature surface 2 from a side in a direction perpendicular thereto.

The ball diameter is represented by $D_a$, and the ball rolling surface is a groove extending linearly in the longitudinal direction with the goodness of fit of "f" and radius of curvature of "$fD_a$". FIGS. 7A and 7B show the condition, with an addition of the load "Q", in which an elastic deformation is caused at a contacting portion between the ball and the ball rolling surface, a contacting ellipsoid of long radius "a" and short axis "b" is formed, and a contacting stress of $\rho_{max}$ is caused.

Then, in a case of a general rolling motion device, the ball and the ball rolling surface are formed of the same material, i.e., vertical elastic coefficient (modulus of elasticity) E and Poisson's ratio 1/m are handled to be equal to each other, so that the long radius "a" and short radius "b" of this contacting ellipsoid are shown in the following equation (Equation 4).

$$\left. \begin{array}{l} a = \mu \cdot \sqrt[3]{\dfrac{3(1-1/m^2)Q}{E \cdot \Sigma\rho}} \\[2mm] b = \nu \cdot \sqrt[3]{\dfrac{3(1-1/m^2)Q}{E \cdot \Sigma\rho}} \end{array} \right\} \quad \begin{array}{l} E\text{: Young's modulus} \\ 1/m\text{: Poisson's ratio} \end{array}$$  [Equation 4]

Figure 8:
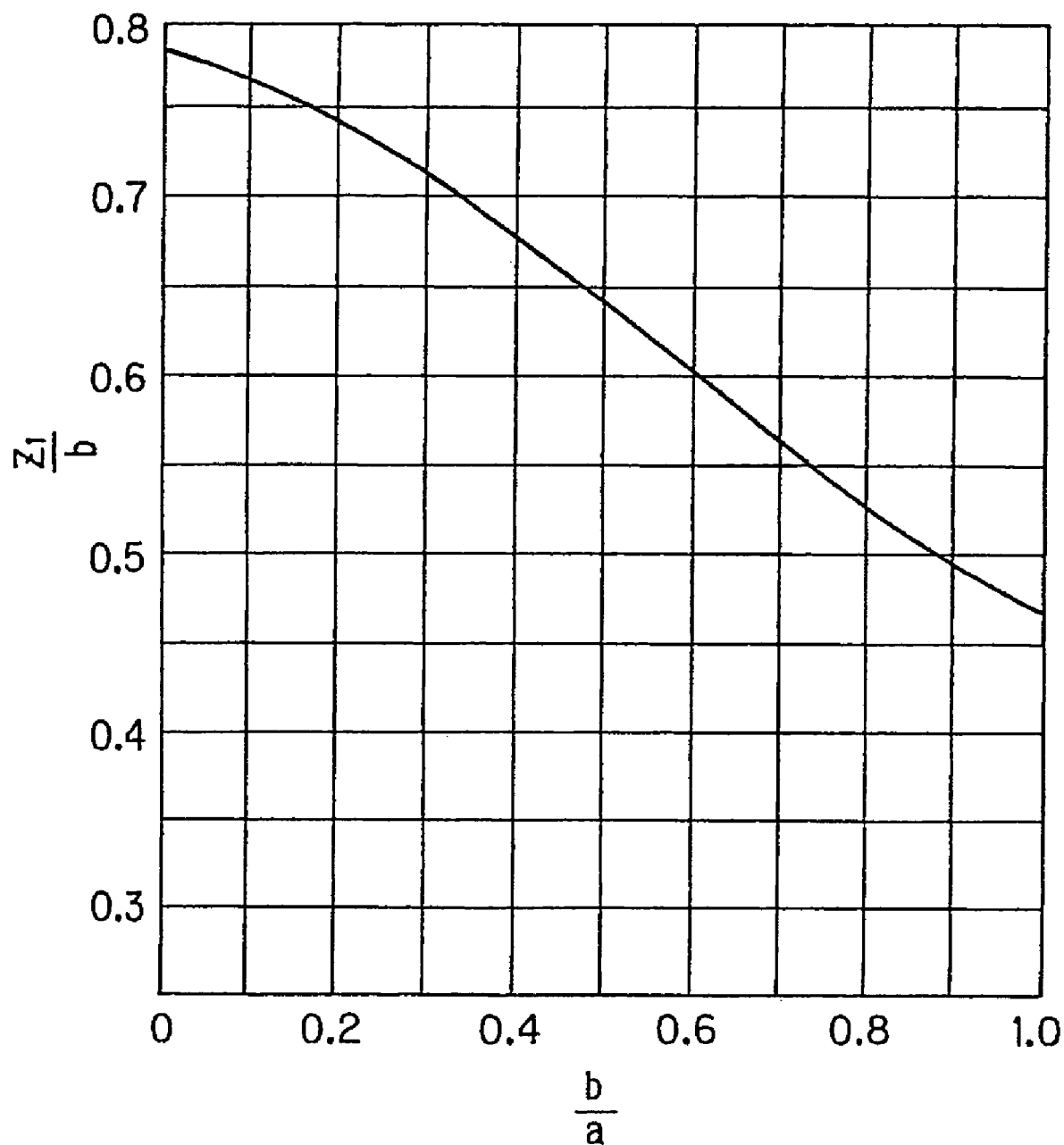
[FIG. 8] is a view showing a relationship among a radius "a" of long axis, a radius "b" of short axis and a depth "$z_1$" of maximum shearing stress.

From the long axis radius "a", the short axis radius "b" and the view of FIG. 8, the maximum shearing stress depth "$z_1$" will be obtained. Further, in the case of the track rail 11 of the present embodiment shown in FIG. 3, the minimum thickness of the rolling portion 30 is obtained "$z_1=0.082$". From this matter, it will be found that the rolling portion 30 may have the minimum thickness of more than 0.082 mm.

Maximum Thickness

Because the metal material such as steel constituting the endless circulation passage has a thin thickness in comparison with its length, it is difficult to avoid deflection (bending) at a working time. Such deflection may be reduced by straightening, but it is impossible to make zero such deflection. When the metal material including such deflection is jointed to the FRP, it follows the shape of the FRP at a time of extremely thin metal material and any influence is not applied to a product. However, in a case of having some degree of the thickness of the metal material, the shape of the FRP is influenced, and as a result, the linearity of the product will be adversely affected. Then, it is necessary to determine a thickness having some degree as the maximum thickness. Bending rigidity is expressed as EI (E: vertical elasticity coefficient; I: second moment of area), and in a case where the bending rigidity EI of this FRP is five times or more the bending rigidity of the metal material, it is considered that no problem occurs.

Incidentally, for example, in consideration of the track rail 11 shown in FIG. 3, the rolling portion 30 formed of the metal material has a large bending in the lateral direction on the drawing at the working time, so that it is necessary to consider the rigidity in the lateral direction on the drawing.

Figure 9:
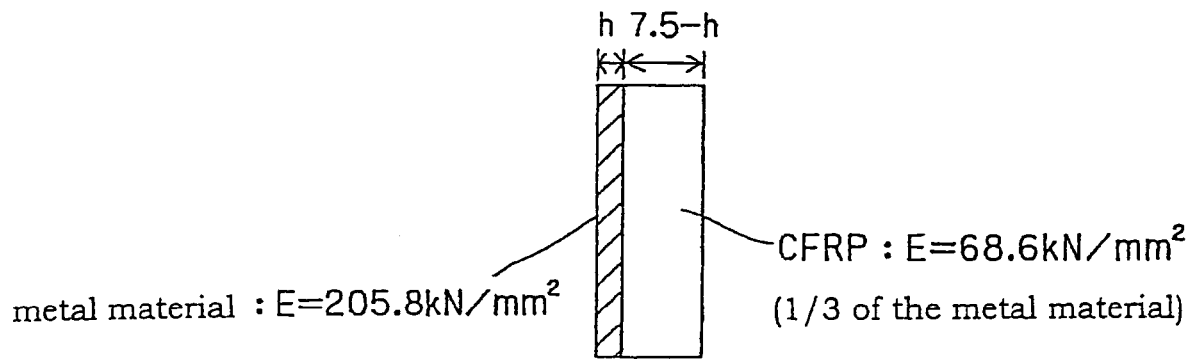
[FIG. 9] is a schematic view showing a joined portion of a metal material and an FRP in the track rail of the present embodiment.

When the portion shown with the arrow "α" in FIG. 3 is extracted and simplified, a schematic view as a model shown in FIG. 9 will be obtained. The sum of dimensions in the thickness direction of the rolling portion 30 formed of the metal material and the track body 31 formed of the FRP is {(60−45)/2}=7.5 mm in the case of FIG. 3.

Accordingly, as shown in FIG. 9, when the thickness of the rolling portion 30 formed of the metal material is "h", the thickness of the track body 31 formed of the FRP will be expressed as (7.5−h).

Further, as mentioned above, since there is no problem in the case where the bending rigidity El of the FRP is five times or more the bending rigidity of the metal material, it may be desired that the maximum thickness of the rolling portion 30 formed of the metal material is less than thickness $h_2$ obtained from the following equation (Equation 5)

$$\frac{E_1 I_1}{E_2 I_2} = \frac{E_1 h_1^3}{E_2 h_2^3} \geq 5 \qquad \text{[Equation 5]}$$

wherein:
$E_1$: vertical elasticity coefficient of FRP
$I_1$: second moment of area
$h_1$: thickness of FRP
$E_2$: vertical elasticity coefficient of metal material
$I_2$: second moment of area of metal material
$h_2$: thickness of metal material With such Equation 5, when the condition of the tack rail 11 of the present embodiment shown in FIG. 9 substitutes, the following equation (Equation 6) will be obtained.

$$\frac{E_1 I_1}{E_2 I_2} = \frac{E_1 h_1^3}{E_2 h_2^3} = \frac{68.6 \cdot (7.5 - h)^3}{205.8 \cdot h^3} \geq 5 \qquad \text{[Equation 6]}$$

$$h \leq 2.16$$

From this equation, it will be found that the maximum thickness of the rolling portion 30 is less than 2.16 millimetres.

Further, it is to be noted that the above calculation for obtaining the maximum thickness of the rolling portion 30 will be applicable not only to the shape of the tack rail 11 according to the present embodiment, but also to the rolling portions 41 - - -, 42 forming a portion near the return passage 16 - - - or near the opening 13b, or the movable member such as ball screw nut or spline nut. In addition, it may be also applicable to a ball screw shaft such as screw shaft 14 attached to be rotatable and movable through the balls 12 - - - or a shaft member such as spline shaft.

Figure 10:
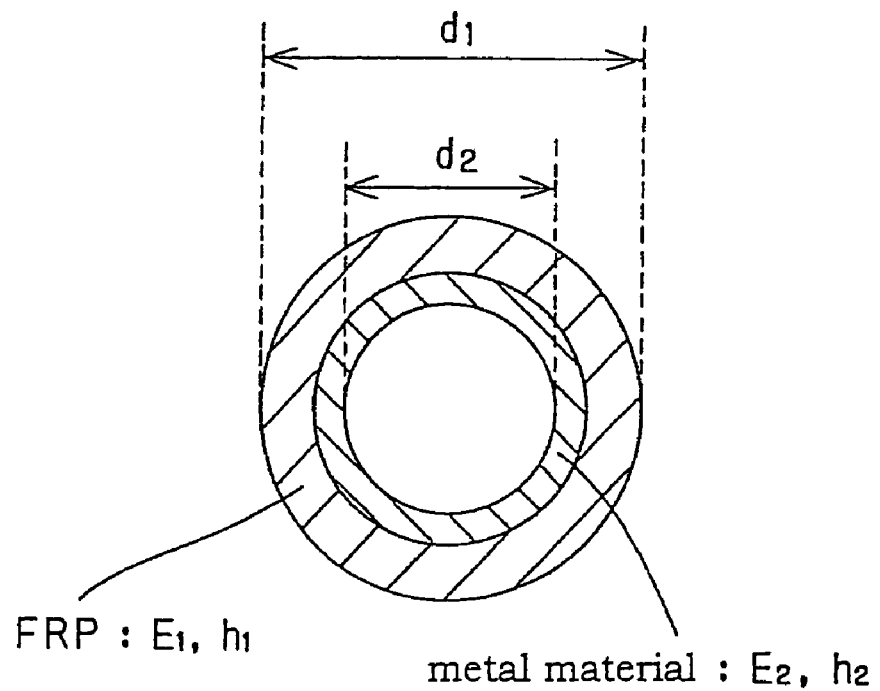
[FIG. 10] is a view for explaining a theory for deforming a basic equation for calculating the maximum thickness of the metal material to an equation for the movable member such as ball screw nut or spline nut.

In the case where the above calculation is applied to the movable member such as rolling portions 41 - - -, 42 shown in FIG. 4, a ball screw nut shown in FIG. 10, or a spline nut, the maximum thickness of the metal material can be calculated by deforming the above-mentioned Equation 5 to the following equation (Equation 7). Further, in the following equation, "$d_1$" shows an outer diameter of the FRP and "$d_2$" shows an inner diameter of the metal material.

$$\frac{E_1 I_1}{E_2 I_2} = \frac{E_1 \{d_1^4 - (d_2 + 2h_2)^4\}}{E_2 \{(d_2 + 2h_2)^4 - d_2^4\}} \geq 5 \qquad \text{[Equation 7]}$$

Figure 11:
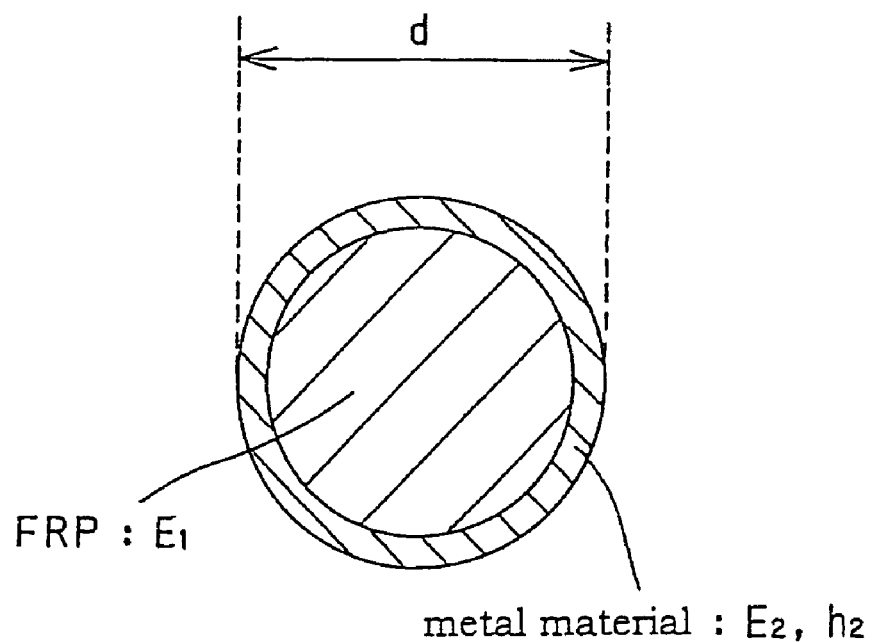
[FIG. 11] is a view for explaining a theory for deforming the basic equation for calculating the maximum thickness of the metal material to an equation for a shaft member such as ball screw shaft or spline shaft.

Furthermore, in the case where the calculation is applied to the screw shaft 14 shown in FIGS. 1 and 2, the ball screw shaft shown in FIG. 11 or a shaft member such as spline shaft, the Equation 5 will be deformed to the following equation (Equation 8). In this case, the maximum thickness of the metal material can be also calculated. Further, in this equation, "d" denotes the outer diameter of the metal material.

$$\frac{E_1 I_1}{E_2 I_2} = \frac{E_1 (d - 2h_2)^4}{E_2 \{d^4 - (d - 2h_2)^4\}} \geq 5 \qquad \text{[Equation 8]}$$

The installation standard of the metal material and the FRP was described hereinabove. Next, a specific molding method of the FRP will be explained in detail. By suitable molding method of the FRP mentioned hereunder, a motion guide device having high rigidity and long life time can be obtained.

Molding Method of FRP

The FRP is a material which is reinforced by mixing a reinforcing fiber such as glass fiber into a plastic, and the molding method thereof includes hand lay up method or spry up method in which the reinforcing fiber is laid in a die and the plastic preliminarily mixed with a hardening agent is multiply layered while degassing, or an SMC (Sheet Molding Compounds) press method in which a sheet-like material in which the reinforcing fiber and the plastic are preliminarily mixed is compressed and molded with a die. However, in the motion guide device of the present invention, since an influence of pressure added from an external portion such as an object to be guided is considered in addition to mutual influence of the members such as rolling member and movable member, the laminating direction of the reinforcing fiber constitutes a very important factor, and it is also necessary to mold a portion having a complicated shape while maintaining the strength without cutting off the reinforcing fiber.

Figure 12A:
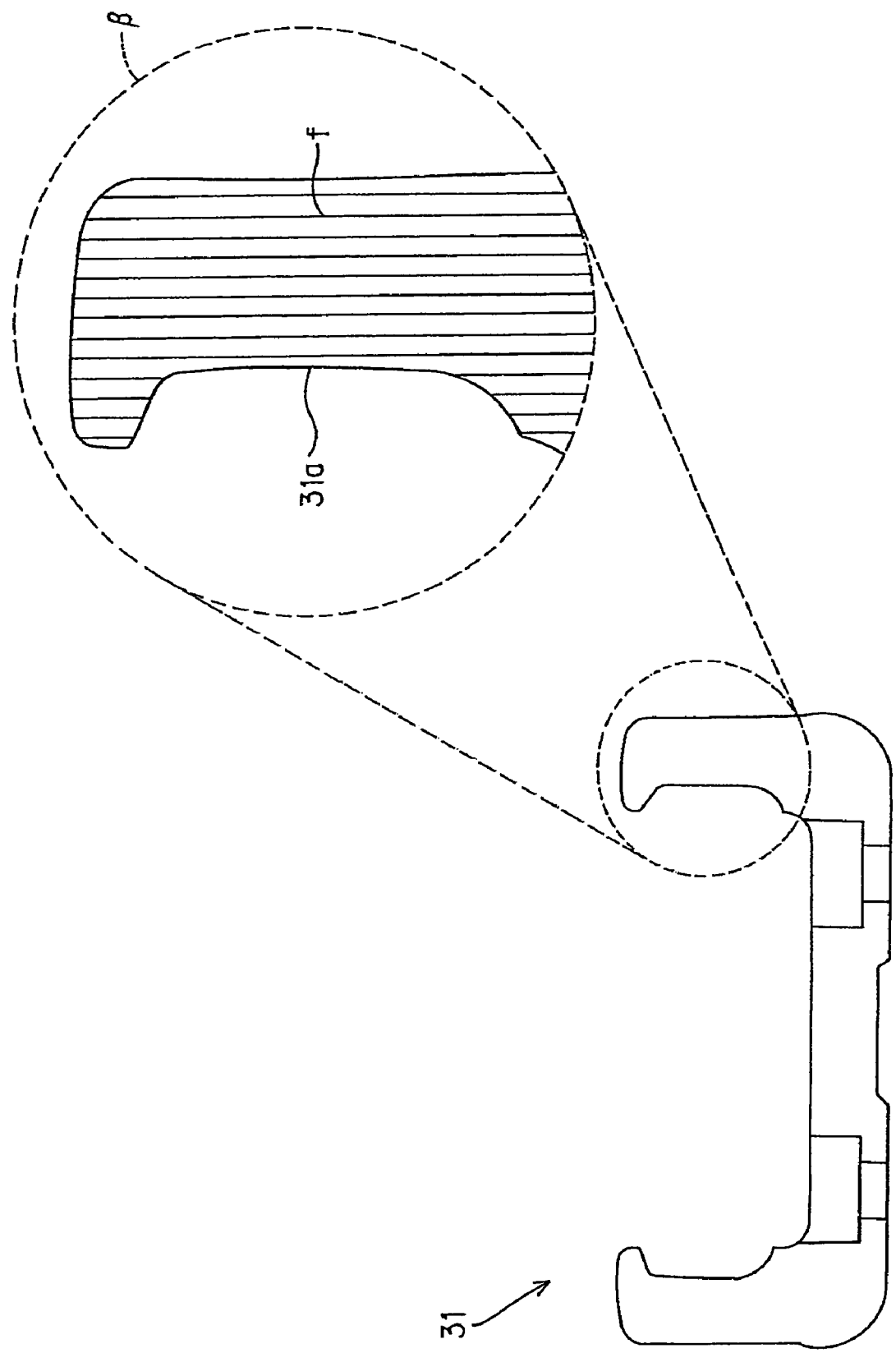
[FIG. 12A] is a cross sectional view showing only a track member body according to the present embodiment, and more specifically, is a view showing a case in which the joining surface of the rolling portion is molded by a machine working.

For example, FIG. 12A is a view of the elevational section showing only the track member body 31 before the provision of the rolling portion 30 formed of the metal material in the track rail 11 used for the motion guide device 10 of the integral type in combination of the linear motion guide and the ball screw. With this track member body 31, as is apparent from an enlarged view of a broken line circle shown with the mark β in FIG. 12A, in consideration of the loading direction from the loaded rolling groove 11a formed thereafter, a vertical reinforcing fiber "f" becomes important on the viewpoint of the strength and withstanding force. In order to most easily manufacture the track member body 31, as shown in FIG.

12A, it will be considered to perform machine working to the joining surface 31a of the rolling portion 30.

Figure 12B:
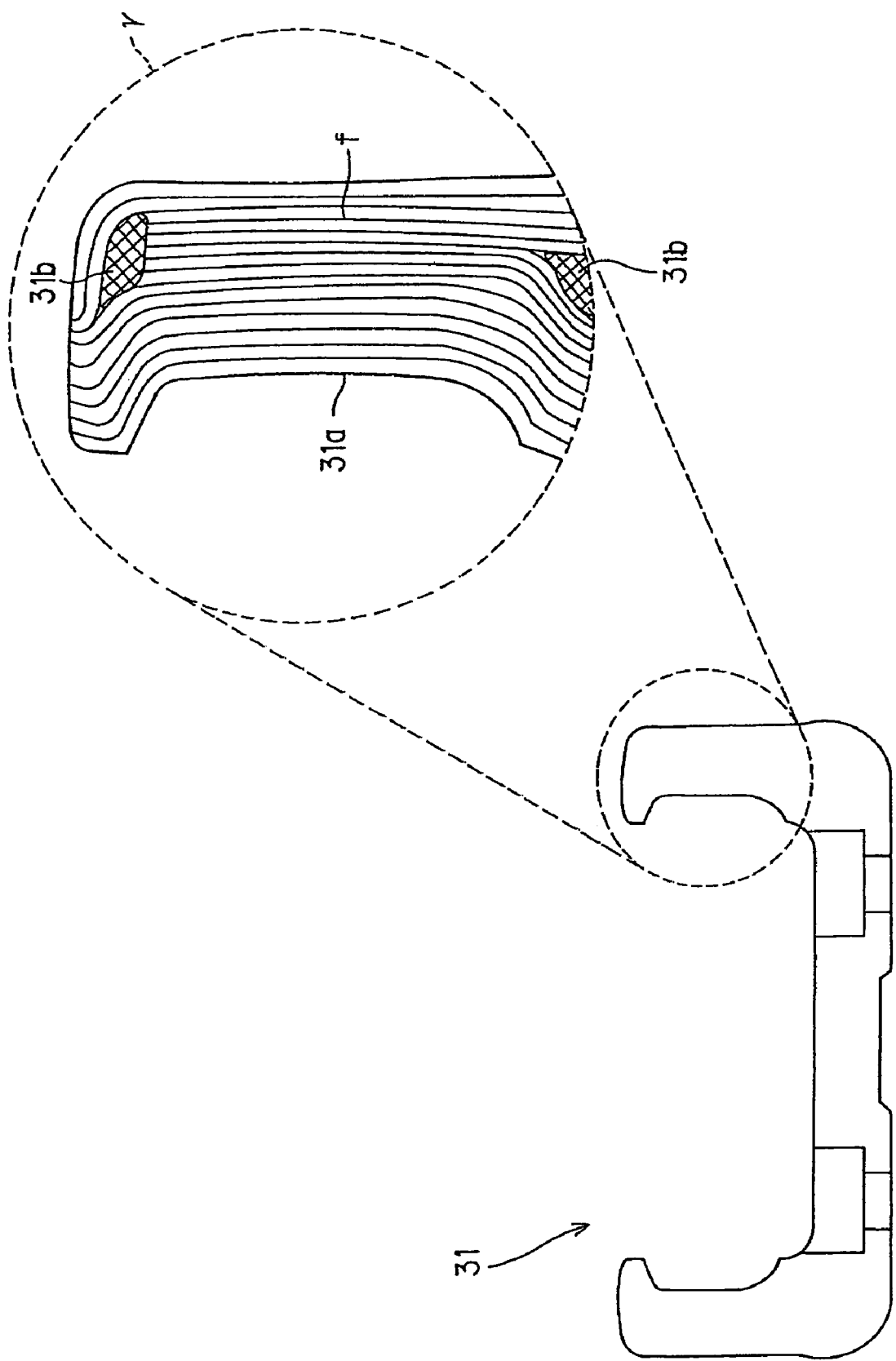
[FIG. 12B] is a cross sectional view showing only a track member body according to the present embodiment, and more specifically, is a view showing a case in which the joining surface of the rolling portion is molded by laminating a reinforced fiber.

However, as shown in FIG. 12A, the cutting-off of the reinforced fiber "f" by the machine working will cause the lowering of the strength, which is not preferred for the molding method of the member constituting the motion guide device. Then, with the track member body 31 according to the present embodiment, as shown in FIG. 12B, the reinforced fiber "f" is laminated along the shape of the track member body 31 so as to constitute the track member body 31 with the reinforced fiber which is not cut off. Thus, by forming the constituting member of the motion guide device with the reinforced fiber not cut off, it is possible to provide the motion guide device having high rigidity and long life time.

Further, FIGS. 12A and 12B only show the state in which the reinforced fiber "f" is laminated vertically, but the laminating direction may be determined in consideration of the influence of an outer configuration of a member to be molded or an external load to be applied, and in addition, such laminating direction may include every direction, such as an oblique direction and a combined direction of vertical, horizontal and oblique directions, other than the vertical direction or the horizontal direction.

In addition, in the case of the member having complicated outer appearance, a desired shape may not be molded only by the lamination of the fiber "f". In such case, as shown in an enlarged view of a broken line circle shown with the letter v in FIG. 12B, a complicated shape may be realized by inserting a nest 31b into the member. The nest 31b may be formed from an FRP block molded with the same material as that of the reinforced fiber "f", as well as aluminium exclusion, aluminium case, resin, iron, copper foaming resin or the like. Furthermore, as the material of such nest 31b, in consideration of lightness, a honeycomb structure may be adopted for the aluminium material for realizing some extent of strength, or an inner hollow structure may be adopted for the case of the iron or copper material.

Figure 12C:
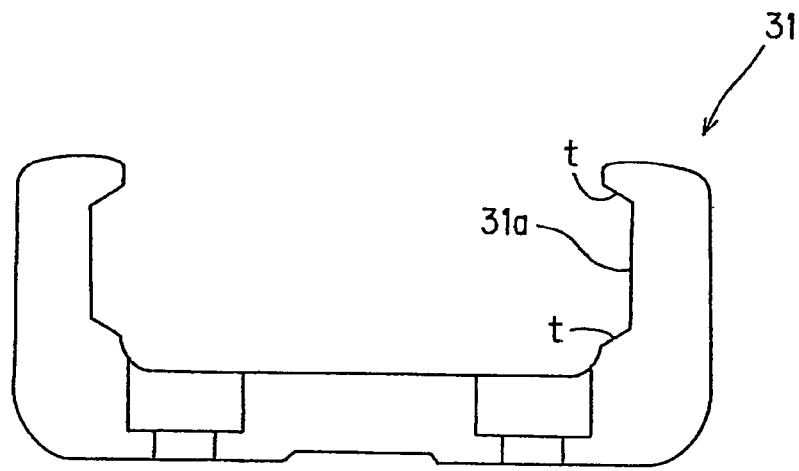
[FIG. 12C] is a cross sectional view showing another example of the joining surface of the track member body according to the present embodiment shown in FIG. 12B.

Still furthermore, in the embodiment shown in FIG. 12B, the shape of the vertical section of the joining surface 31a formed to the track member body 31 is made into a shape including R-shape. However, as shown in FIG. 12C, for example, it may be possible to form the joining surface 31a of the track member body 31 so as to provide a vertical section including the R-shape or a tapered shape "t". Accordingly as mentioned above, it becomes possible to mold a member having a complicated outer configuration without cutting off the reinforced fiber "f" by changing the shape in a possible range, such as for example, by changing the shape of the joining surface 31a into a shape including the R-shape or tapered shape "t". That is, by eliminating the incorporation of an extra member such as nest 31b by changing the shape of the joining surface 31a, the manufacturing cost and material cost can be reduced, and in addition, it becomes possible to provide the track member body 31 having high rigidity and long life time.

Hereinabove, although the preferred embodiments of the present invention were described, the technical idea of the present invention is not limited to the described range, and many other changes and modifications may be applied. That is, in the described embodiment, the present invention provides the motion guide device 10 of the integral type in combination of the linear motion guide and the ball screw. However, the present invention may be applicable to every motion guide device such as roller bearings for every machine tool, non-lubricant type bearing, linear guide, linear guide device, ball spline device, ball screw device or the like.

In addition, in the motion guide device according to the present embodiment, there is provided an example in which the ball 12 serving as rolling member circulate endlessly in the endless circulation passage 20, but the rolling member may be composed of roller, and moreover, a limited-type, not endless-type, circulation passage may be provided.

Furthermore, in the motion guide device of the described embodiment, there is provided an example in which the track rail 11 as the track member and the movable member 13 are disposed via the balls 12 as rolling member. However, the present invention may be applicable to not only a device including the rolling guide motion but also a motion guide device including a slinging motion in which the track member and the movable member are disposed via no rolling member such as ball or roller.

Still furthermore, in the motion guide device of the present embodiment, the insertion method of the nest 31b is explained with reference to FIG. 12B, the present invention is not limited to this example, and it is possible to determine the more suitable shape of the nest 31b and the nest insertion portion in consideration of the influence of an outer configuration of the member to be molded or an external load to be applied.

Figure 13:
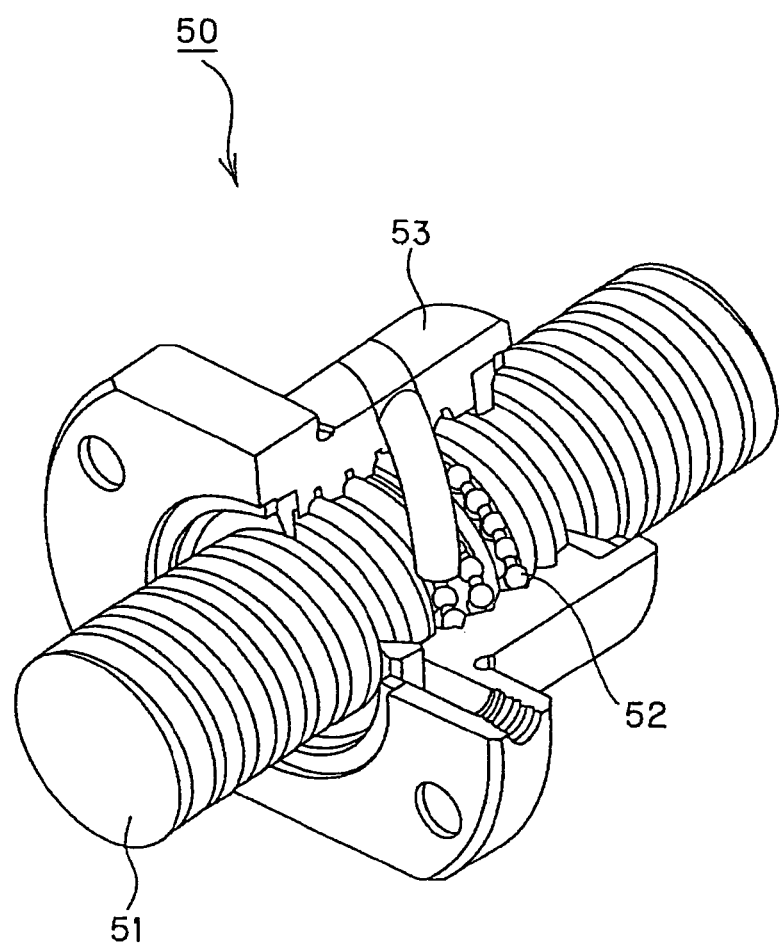
[FIG. 13] is a view showing an example in which the motion guide device of the present invention is formed as a ball screw device.

Still furthermore, in the motion guide device of the present embodiment, it is possible to construct the device to the ball screw device such as shown in FIG. 13. That is, the motion guide device of the present invention may be constructed as a ball screw device 50 including the screw shaft 51 as the track member, and the nut 53 as the movable member mounted to screw shaft 51 via a plurality of balls 52 to be relatively rotatable. The portion near the rolling member rolling surface at which the screw shaft 51 and the nut 53 are contacted to the balls 52 can be formed of the metal material, and the other portions can be formed of the FRP. Accordingly, it becomes possible to provide the device having high rigidity and high strength with compact weight.

Further, it is apparent from the recitations of the appended claims that embodiments including the above mentioned changes and modifications may be included in the technical range of the present invention.

The invention claimed is:

1. A motion guide device, comprising:
a track member; and
a movable member mounted to the track member to be movable through a plurality of rolling members,
wherein the track member or movable member includes a rolling portion formed of a metal material constituting a rolling surface of the rolling member in contact to the rolling members, and a track member body or movable member body formed of a fiber reinforced plastics (FRP) forming the track member or movable member by being joined with the rolling portion,
wherein the rolling portion has a minimum thickness more than a maximum shearing stress depth obtained based upon a long axis radius of said rolling portion, a short axis radius of said rolling portion, a radius of curvature of said track member body or movable member body, a load of said track member or movable member body, and a vertical elasticity coefficient of material of said track member body or movable member body, and
wherein the rolling portion has a maximum thickness satisfying an equation of $E_1 I_1 / E_2 I_2 \geqq 5$, wherein: $E_1$: vertical elasticity coefficient of said FRP, $I_1$: second moment of area of said FRP, $E_2$: vertical elasticity coefficient of said metal material and $I_2$: second moment of area of said metal material.

2. The motion guide device according to claim 1, wherein the maximum thickness of the rolling portion is less than a thickness $h_2$ obtained by the following equation of:

$$\frac{E_1 I_1}{E_2 I_2} = \frac{E_1 h_1^3}{E_2 h_2^3} \geq 5$$

wherein:
$E_1$: said vertical elasticity coefficient of said FRP
$I_1$: said second moment of area of FRP
$h_1$: said thickness of said FRP
$E_2$: said vertical elasticity coefficient of said metal material
$I_2$: said second moment of area of said metal material
$h_2$: said thickness of said metal material.

3. The motion guide device according to any one of claims 1 and 2, wherein the FRP is comprised at least one of CFRP, GFRP, or KFRP.

4. The motion guide device according to any one of claims 1 and 2, wherein the metal material and the FRP are joined by a joining method including at least one of bond joining, pressure joining, or bolt joining 5. The motion guide device according to any one of claims 1 and 2, wherein in the track member or movable member, reinforced fibers in the FRP are laminated along the shape of the track member or the movable member.

6. The motion guide device according to any one of claims 1 and 2, wherein in the track member or the movable member, reinforced fibers in the FRP are laminated along the shape of the track member or the movable member and a nest is provided within a gap between said reinforced fibers.

7. The motion guide device according to any one of claims 1 and 2, wherein the motion guide device is formed as a ball screw device provided with a screw shaft as the track member and a nut mounted on the screw shaft through a plurality of rolling members to be relatively rotatable.

\* \* \* \* \*